United States Patent [19]

Mita et al.

[11] Patent Number: 4,507,469

[45] Date of Patent: Mar. 26, 1985

[54] CURABLE COMPOSITION COMPRISING POLYETHER HAVING SILYL GROUP

[75] Inventors: Tetsuo Mita; Hirotazu Nakanishi; Junji Takase; Katsuhiko Isayama; Nobutaka Tani, all of Kobe, Japan

[73] Assignee: Kanegafuchi Kagaku Kogyo Kabushiki Kaisha, Osaka, Japan

[21] Appl. No.: 524,029

[22] Filed: Nov. 8, 1983

Related U.S. Application Data

[63] Continuation of Ser. No. 392,561, Jun. 28, 1982, abandoned, which is a continuation of Ser. No. 210,315, Nov. 25, 1980, abandoned, and a continuation of Ser. No. 055,144, Jul. 6, 1979, abandoned.

[30] Foreign Application Priority Data

Jul. 7, 1978 [JP] Japan ................................. 53/83283

[51] Int. Cl.$^3$ ............................................. C08G 65/00
[52] U.S. Cl. ...................................... 528/425; 525/50; 525/446; 525/474; 528/10; 528/12; 528/18; 528/21; 528/29; 528/421; 528/901; 528/403
[58] Field of Search .................. 528/425, 901, 10, 12, 528/18, 21, 29, 404, 421; 525/50, 446, 474

[56] References Cited

U.S. PATENT DOCUMENTS

| | | | |
|---|---|---|---|
| 2,676,948 | 4/1954 | Rowley | 260/18 S |
| 3,070,559 | 12/1962 | Nitzsche et al. | 260/18 S |
| 3,231,527 | 1/1966 | Ceyzeriat | 528/901 |
| 3,408,321 | 10/1968 | Ashby | 260/37 SB |
| 3,592,795 | 7/1971 | Ashby | 260/37 SB |
| 3,632,557 | 1/1972 | Brode et al. | 528/44 |
| 3,647,846 | 3/1972 | Hartlein et al. | 528/901 |
| 3,676,420 | 7/1972 | Fulton et al. | 528/901 |
| 3,839,280 | 10/1974 | Zdaniewski | 260/18 S |
| 3,971,751 | 7/1976 | Isayama et al. | 260/37 R |

OTHER PUBLICATIONS

Hay, U.S.P. 3,306,875, cols. 1-2, 35-36.

Primary Examiner—Harold D. Anderson
Attorney, Agent, or Firm—Moonray Kojima

[57] ABSTRACT

A curable composition comprising an organic polymer containing at least one hydrolyzable a group attached to the silicon per polymer molecule and having a molecular weight within the range of 300 to 15,000, wherein a curing catalyst comprising tin II salt of organic carboxylic acid and/or lead II salt of organic carboxylic acid is used in combination with an acid material and/or a basic material, thereby unexpectedly improving the set resistance thereof. The composition may be utilized as a sealant which cures upon exposure to moisture to form a rubber like substance having improved set resistance.

2 Claims, No Drawings

CURABLE COMPOSITION COMPRISING POLYETHER HAVING SILYL GROUP

This is a continuation of application Ser. No. 392,561 filed 6/28/82 which is a continuation of 210,316 filed 11/25/80 and 055 filed 7/6/79 all now abandoned.

BACKGROUND OF THE INVENTION

This invention relates to curable compositions comprising polymers containing silyl groups.

Compositions of organic polymers containing silyl groups which are capable of being cured to rubber-like materials upon exposure to moisture in the atmosphere may be used, for example, as sealants for buildings and the like. Compositions based on polysulfides, urethanes and silicones have been commercially available as elastomeric sealants but each has its own set of problems and leave something to be desired. The polysulfide based compositions have poor resistance to heat, that is, they lose elasticity, and have poor set resistance. This latter property may be defined as the amount (percent) by which a standard test piece fails to recover its original thickness after being subjected to a standard compressive or extensive load for a fixed period of time. A higher recovery percentage means good set resistance. The urethane based compositions have poor resistance to heat and poor resistance to weather. Insofar as the silicone based composition is concerned, it exhibits good set resistance, but suffers from such problems as inadequate curing under hot and humid conditions and bad staining to stone.

Curable compositions having good storage stability and adhesion, as well as excellent strength and estensibility, were disclosed in Japanese Laid Open Pat. No. 73998/1977. However, their set resistance was not fully satisfactory. Thus, there is still a deficiency in the art of a curable composition which has good physical properties and in addition good set resistance.

SUMMARY OF THE INVENTION

Accordingly, an object of the invention is to provide a a curable composition comprising an organic polymer containing a silyl group which has physical properties comparable to other curable compositions, and which additionally has good set resistance.

The foregoing and other objects of the invention are attained in this invention which encompasses a curable composition comprising an organic polymer containing at least one hydrolyzable group attached to the silicon per polymer molecule and having a molecular weight within the range of 300 to 15,000, and a curing catalyst system comprising tin II salt of organic carboxylic acid and/or lead II salt of organic carboxylic acid in combination with an acid material and/or a basic material. Advantageously, the composition has unexpectedly good set resistance in addition to comparable other physical properties.

A feature of the invention is the use of a curing catalyst system comprising tin II salt of organic carboxylic acid and/or lead II salt of organic carboxylic acid in combination with an acid material and/or a basic material.

The foregoing object, features and advantages may be further understood when read in conjunction with the following description.

DETAILED DESCRIPTION OF PREFERRED EMBODIMENTS

Representative examples of the tin (II) salt of an organic carboxylic acid and/or lead (II) salt of an organic carboxylic acid employed in the invention includes preferably $$M(OCOR')_2$$

wherein M is Sn and/or Pb and R' is a monovalent hydrocarbon having 2 to 20 carbon atoms. Examples of these are tin II hexanoate, tin II 2-ethyl hexanoate, tin II naphtenate, tin II decanoate, tin II stearate, tin II laurate, tin II oleate, and tin II octylate; lead II 2-ethyl hexanoate, lead II octylate, lead II hexanoate, lead II decanoate, lead II stearate, lead II laurate, lead II oleate, lead II naphtenate.

The acidic material may be organic or inorganic acid, with organic carboxylic acid being preferred. In general organic carboxylic acids having 1 to 20 carbon atoms may be used, such as for example, acetic acid, propionic acid, caproic acid, caprylic acid, 2-ethyl hexanoic acid, capric acid, laupric acid, oleic acid, stearic acid, oxalic acid, citric acid, chloroacetic acid, acrylic acid, methacrylic acid, m-nitrobenzoic acid, p-nitrobenzoic acid, etc.

Especially preferred as the basic material are organic amine compounds. Examples of amines which can be used are diethylenetriamine, triethylenetetramine, tetraethylenepentamine, butylamine, hexylamine, octylamine, decylamine, laurylamine, hexamethylenediamine, triethanolamine, dibutylamine, diethanolamine, N,N,-N',N'-tetramethyl-1,3-butanediamine, benzylamine, cyclohexylamine, dodecamethylenediamine, dimethylethylenediamine, dimethylaminoethanol, N,N,N',N'-tetramethylethylenediamine, triethylamine, N,N-dimethylaniline, dimethylbenzylamine, etc.

The amount of acidic material and/or basic material to be used is preferably 0.001 to 10 parts by weight, or more advantageously 0.05 to 10 parts by weight, per hundred parts by weight of the polymer.

Although the tin (II) salt of an organic carboxylic acid and/or the lead (II) salt of an organic carboxylic acid, can be used alone, there is a synergistic effect producing unexpectedly good results, when said tin salt and/or lead salt is used in combination with the acidic material, such as carboxylic acid, and/or basic material, such as amine, and especially at room temperature. When the curable composition contains one or more fillers or one or more plasticizers in considerable amounts, the curing velocity may become slow at room temperature and heating may be useful.

The amount of tin (II) salt and/or lead (II) salt to be used in this invention is preferably 0.01 to 10 parts by weight per hundred weight parts of the polymer.

When the composition is used for example as sealants in construction work, the curable composition in accordance with the present invention may be provided either as a one pack type or as a two pack type. When provided as a one pack type, the composition may be prepared by a kneader or a paint roll under anhydrous conditions and filled in a container which can block moisture. On the other hand, in the case of a two pack type, the curing accelerator and other components may be prepared separately.

The organic polymer in accordance with the present invention may be any of various polymers containing at least one silicon containing group per polymer molecule and capable of being cured with moisture. Especially preferred examples are such polymers having a molecular weight of between 300 and 15,000, with the main chain being comprised of a polyether or a polyester, such as described in U.S. Pat. Nos. 3,408,321; 3,592,795; 3,632,557; and 3,971,751. The polymers must contain a silicon group having hydrolyzability and the process for preparation of such polymers is disclosed in the above literature. In view of characteristics and economy, the hydrolyzable silicon group is preferably a silyl group of the formula:

wherein "a" is an integer of 0,1 or 2; "R" is a monovalent hydrocarbon group and "X" is a hydrolyzable group. Examples of the hydrolyzable group are hydride group, alkoxy group, acyloxy group, ketoximato group see U.S. Pat. No. 3,592,795, aminoxy group see U.S. Pat. No. 3,592,795, amide group see U.S. Pat. No. 3,971,795, acid amide group see U.S. Pat. Nos. 3,378,520, and 3,971,751, etc. Especially preferred is the alkoxy group.

The composition in accordance with the present invention may further contain one or more other ingredient which may be active or inactive, such as fillers, additives, etc. Common fillers may be used, such as calcium carbonate, kaolin, talc, titanium oxide, aluminum silicate, carbon black, etc. These may be used in amounts of from 0 to 300 parts by weight per 100 parts by weight of organic polymer. Plasticizers, such as DOP (diocyl phthalate), BBP (butyl benzyl phthalate), chlorinated paraffins, epoxidized soy bean oil and the like may be used in amounts of from 0 to 200 parts by weight per hundred parts by weight of organic polymer. For anti-sagging agents, hydrogenated castor oil, silicic anydride, etc., may be used. As aging inhibitors, various agents classified as ultraviolet light absorbers, radical chain terminators, peroxide decomposers, etc, can be used singly or in combination.

The function of the curing catalyst system comprising the tin (II) salt of an organic carboxylic acid and/or lead (II) salt of an organic acid in combination with the acid material, such as the carboxylic acid, and/or the basic material, such as the amine, is believed to be the participation in the hydrolysis and condensation reaction of the group

at the terminal or in the side chain of the polymer, thus contributing to the formation of ideal crosslinking for the elastomers. But, the exact details of the mechanism are not fully understood. However it is known that unexpectedly good set resistance is attained as a result.

The following examples are set forth hereinbelow to further describe the invention. It is, however, to be understood that the examples are not to be interpreted in any manner to be limiting of the invention.

EXAMPLE 1

To 100 parts by weight of an oxypropylene polymer of an average molecular weight of 8,000 and having

group at 80% of the total terminals, were added 10 parts by weight of DOP, 1 part by weight of an aging inhibitor, styrenated phenol, 1 part by weight of a curing catalyst comprising lead (II) 2-ethyl hexanoate and 0.1 part by weight of laurylamine and mixed uniformly to give a curable composition.

The composition was poured into a mold of H type according to JIS (Japanese Industrial Standard) A5757, and cured in an atmosphere of 70° C. and 100% humidity for 24 hours. The molded product was taken out and treated in an atmosphere of 50° C. and 55% humidity for 7 days. The cured composition thus produced had unexpectedly good set resistance as shown in Table 1.

TABLE 1

| Conditions for Setting | Percent Recovery (%) | |
|---|---|---|
| | 8 hrs after set removal | 24 hrs after set removal |
| 40° C.; 20% compression 24 hours | 98 | 99 |
| 50° C.; 30% compression 24 hours | 95 | 96 |

Note:
The percent recovery is the degree of recovery on given deformation as expressed in percent (%).

EXAMPLE 2

The same procedure as that of Example 1 was carried out except that each of the following catalyst systems comprising tin (II) and/or lead (II) salt of an organic carboxylic acid in combination with acidic and/or basic material, and as shown in Table 2, was employed in place of lead (II) -2-ethylhexanoate and laurylamine. Each of the cured compositions showed an excellent set resistance as shown in Table 2.

TABLE 2

| Run | Catalyst system | Parts by weight | Recovery (%) | |
|---|---|---|---|---|
| | | | 3 hrs after set recovery | 24 hrs after set recovery |
| 1 | Pb (II) stearate Triethylenetetramine | 2 2 | 92 | 93 |
| 2 | Sn (II) 2-ethyl hexanoate Triethylenetetramine | 1 3 | 55 | 68 |
| 3 | Sn (II) laurate Laurylamine | 2 1 | 94 | 96 |
| 4 | Sn (II) naphtenate Stearylamine | 2 0.5 | 96 | 97 |
| 5 | Pb (II) laurate Capric acid | 2 2 | 90 | 92 |

Condition for setting: 40° C.; 20% compression; 24 hours.

EXAMPLE 3

To 100 parts by weight of an oxypropylene polymer of an average molecular weight of 9,000 and having

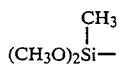

group at 80% of the total terminals, were added 30 parts by weight of DOP, 50 parts by weight of calcium carbonate, 50 parts by weight of kaolin, 25 parts by weight of titanium oxide, 3 parts by weight of hydrogenated castor oil as an anti-sagging agent, and 1 part by weight of styrenated phenol as an aging inhibitor. The mixture was then stirred thoroughly with a spatula. Then, it was passed through a three roll paint mill three times. The composition thus obtained was stable at room temperature for over six months.

Twenty six parts by weight of the resulting composition were taken, 0.3 parts by weight of tin (II) 2-ethyl hexanoate and 0.1 part by weight of caprylic acid were added thereto and mixed thoroughly with a spatula. The mixture was cured in an atmosphere of 23° C. and 55% humidity after 7 days and then treated in an atmosphere of 50° C. and 55% humidity for 7 days, and then subjected to tests for set resistivity. The cured composition thus obtained had unexpectedly good set resistance as shown in Table 3.

TABLE 3

| Conditions for Setting | Percent recovery (%) | |
| --- | --- | --- |
| | 8 hours after set removal | 24 hours after set removal |
| 40° C.; 20% compression 24 hours | 90 | 93 |
| 50° C.; 30% extension 24 hours | 87 | 90 |

Another mixture was prepared and cured as a reference example, in the same manner as above except that 0.2 parts by weight of dibutyl tin dilaurate was used in place of 2-ethyl hexanoate, and capric acid. The cured composition obtained for use as reference had poor set resistance. The percent recovery using the setting conditions of 20% compression, at 40° C. for 24 hours, were 20% eight hours after removal, and 25% 24 hours after removal. As shown in Table 3, the comparisons of 90% vs 20% for 8 hours after release, and of 93% vs 25% for 24 hours after release, show explicitly the unexpectedly good results produced by the instant invention in terms of good set resistance.

EXAMPLE 4

To 100 parts by weight of an oxypropylene polymer of an average molecular weight of 10,000 and having

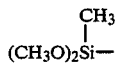

group at 85% of the total terminals, were added 50 parts by weight of carbon black, kneaded thoroughly in a paint roll, then 5 parts by weight of tin (II) stearate and 0.1 part by weight of ethanolamine were added thereto after which the mixture was cured in an atmosphere of 90° C. and 100% humidity for 24 hours. The cured composition thus obtained had unexpectedly good set resistance as shown in Table 4.

TABLE 4

| Conditions for setting | Percent recovery (%) | |
| --- | --- | --- |
| | 8 hrs after set removal | 24 hrs after removal |
| 90° C.; 20% compression 5 hours | 80 | 85 |

EXAMPLE 5

To 100 parts by weight of an oxypropylene polymer of an average molecular weight of 9,000 and having

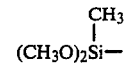

group at 80% of the total terminals, were added 30 parts by weight of DOP, 65 parts by weight of fatty acid treated calcium carbonate, 35 parts by weight of lightweight calcium carbonate, 25 parts by weight of titanium oxide, 3 parts by weight of hydrogenated castor oil as an anti-sagging agent and 1 part by weight of styrenated phenol as an aging inhibitor, kneaded thoroughly with a spatula and passed through a three roll paint mill. Two parts by weight of tin (II) 2-ethyl hexanoate, 1 part by weight of lead (II) stearate and 1 part by weight of laurylamine were added to the mixture. The mixture was then kneaded thoroughly with a spatula and cured by treating in an atmosphere of 70° C. and 100% humidity for 24 hours and successively in an atmosphere of 50° C. and 55% humidity for 7 days. The cured composition thus obtained had unexpectedly good set resistance, and when subjected to setting under the conditions of 40° C., 20% compression for 24 hours, the percent recoveries were 86% and 91% as measured 3 hours and 24 hours after set removal respectively.

EXAMPLE 6

To 100 parts by weight of a polyester of an average molecular weight of 4,000 obtained by the condensation polymerization of adipic acid and propylene glycol and having

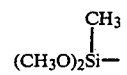

group at 70% of the total terminals, were added 50 parts by weight of DOP, followed by the addition of 2 parts by weight of tin (II) 2-ethyl hexanoate, 0.1 part by weight of decylamine and 1 part by weight of styrenated phenol, and the mixture was cured in an atmosphere of 70° C. and 100% humidity for 48 hours. Thereafter, the molding was taken out from the mold and treated in an atmosphere of 50° C. and 55% humidity for 7 days. The cured composition showed unexpectedly good set resistance.

EXAMPLE 7

To 100 parts by weight of an oxypropylene polymer of an average molecular weight of 8,000 and having

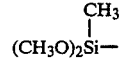

group at 80% of the total terminals, were added 50 parts by weight of epoxidized soy bean oil, 110 parts by weight of calcium carbonate, 30 parts by weight of titanium oxide, 6 parts by weight of hydrogenated castor oil, and 1 part by weight of styrenated phenol. The mixture was then stirred thoroughly with a spatula. Thereafter, it was passed through a three roll paint mill three times. Three hundred parts by weight of the resulting composition were taken, 2 parts by weight of tin (II) 2-ethyl hexanoate, 0.8 part by weight of laurylamine and 0.2 part by weight of capric acid were added thereto and mixed thoroughly with a spatula.

The mixture thus obtained cured rapidly to the degree that the cured composition became tack free on its surface after curing the mixture in an atmosphere of 23° C. and 55% humidity for one day. The mixture also showed excellent set resistance on a sample which was prepared by curing the mixture in an atmosphere of 23° C. and 55% humidity for 7 days, and then successively in an atmosphere of 50° C. and 55% humidity for another seven days.

On the other hand, another mixture which was prepared in the same way as above in the absence of the inventive catalyst system components laurylamine and capric acid, was so slow in curing velocity in an atmosphere of 23° C. and 55% humidity that the curing for 3 days did not produce a tack free surface.

The foregoing description is illustrative of the principles of the invention. Numerous variations and modifications thereof would be apparent to the worker skilled in the art. All such variations and modifications are to be considered to be within the spirit and scope of the invention.

What is claimed is:

1. A curable composition comprising a mixture consisting essentially of 100 parts by weight of a polymer having a polyether as a main chain and containing a silyl group having the formula:

wherein a is an integer of 0, 1, or 2, R is a monovalent hydrogen group and X is a hydrolyzable group selected from the group consisting of hydride, alkoxyl, acyloxy, ketoximato, aminoxy, and amide groups;

0.01 to 10 parts by weight of a catalyst selected from the group consisting of tin (II) salt of an organic carboxylic acid, lead (II) salt of an organic carboxylic acid, and mixtures thereof; and 0.001 to 10 parts by weight of a member selected from the group consisting of an organic carboxylic acid, an organic amine, and mixtures thereof, said organic carboxylic acid and said organic amine having 1 to 20 carbon atoms;

wherein said organic carboxylic acid is selected from the group consisting of acetic acid, propionic acid, caproic acid, caprylic acid, capric acid, lauric acid, oleic acid, naphthenic acid, stearic acid, oxalic acid, citric acid, chloroacetic acid, acrylic acid, methacrylic acid, m-nitrobenzoic acid and p-nitrobenzoic acid;

wherein said organic amine is selected from the group consisting of diethylenetriamine, triethylenetetramine, tetraethylenepentamine, butyl amine, hexylamine, octylamine, decylamine, laurylamine, hexamethylenediamine, triethanolamine, diethanolamine, N,N,N',N'-tetramethyl-1, 3-butanediamine, benzylamine, cyclohexylamine, dodecamethylenediamine, dimethylethylenediamine, dimethylaminoethanol, N,N,N',N'-tetramethylethylenediamine, triethylamine, N,N-dimethylaniline and dimethylbenzylamine; and wherein said tin (II) salt is selected from the group consisting of tin (II) hexanoate, tin (II) 2-ethyl hexanoate, tin (II) naphthenate, tin (II) decanoate, tin (II) stearate, tin (II) laurate, and tin (II) oleate; and wherein said lead (II) salt is selected from the group consisting of lead (II) 2-ethyl hexanoate, lead (II) octylate, lead (II) hexanoate, lead (II) decanoate, lead (II) stearate, lead (II) laurate, lead (II) oleate and lead (II) naphthenate; said composition cures upon exposure to moisture to form a rubber like substance having improved set resistance.

2. The composition of claim 1, wherein said polyether is oxypropylene; said catalyst is selected from the group consisting of lead (II) 2-ethyl hexanoate, lead (II) stearate, lead (II) laurate, tin (II) 2-ethyl hexanoate, tin (II) laurate, tin (II) naphthenate, and tin (II) steatate; said organic amine is selected from the group consisting of lauryl amine, triethylenetetramine, ethanol amine and stearylamine; and said carboxylic acid is capric acid or carpylic acid.

* * * * *